US010298094B2

United States Patent
Yamaguchi et al.

(10) Patent No.: US 10,298,094 B2
(45) Date of Patent: May 21, 2019

(54) FAN COOLED MOTOR WITH DUST CLEANING VENT

(71) Applicant: TOYO ELECTRIC MFG. CO., LTD., Tokyo (JP)

(72) Inventors: Toshihiro Yamaguchi, Yokohama (JP); Tamotsu Ibaraki, Yokohama (JP)

(73) Assignee: TOYO ELECTRIC MFG. CO., LTD., Tokyo (JP)

( * ) Notice: Subject to any disclaimer, the term of this patent is extended or adjusted under 35 U.S.C. 154(b) by 175 days.

(21) Appl. No.: 14/360,838

(22) PCT Filed: Nov. 16, 2012

(86) PCT No.: PCT/JP2012/079802
§ 371 (c)(1),
(2) Date: May 27, 2014

(87) PCT Pub. No.: WO2013/084695
PCT Pub. Date: Jun. 13, 2013

(65) Prior Publication Data
US 2014/0312723 A1 Oct. 23, 2014

(30) Foreign Application Priority Data

Dec. 5, 2011 (JP) ................... 2011-265688

(51) Int. Cl.
*H02K 9/00* (2006.01)
*H02K 9/06* (2006.01)
(Continued)

(52) U.S. Cl.
CPC ............. *H02K 9/06* (2013.01); *H02K 9/26* (2013.01); *H02K 1/20* (2013.01); *H02K 5/20* (2013.01)

(58) Field of Classification Search
CPC .. H02K 9/06; H02K 5/20; H02K 9/00; H02K 9/02; H02K 9/04; H02K 9/08; H02K 9/14;
(Continued)

(56) References Cited

U.S. PATENT DOCUMENTS

| 2,114,907 A | * | 4/1938 | Oesterlein | ............... H02K 9/14 310/57 |
| 3,383,529 A | * | 5/1968 | Baumann | ................. H02K 9/06 310/52 |

(Continued)

FOREIGN PATENT DOCUMENTS

| CN | 1290420 A | 4/2001 |
| CN | 1848620 A | 10/2006 |

(Continued)

OTHER PUBLICATIONS

International Search Report dated for Feb. 12, 2013 the corresponding PCT Application No. PCT/JP2012/079802.
(Continued)

*Primary Examiner* — Bernard Rojas
*Assistant Examiner* — Maged M Almawri
(74) *Attorney, Agent, or Firm* — Leason Ellis LLP

(57) ABSTRACT

In an electric motor for a vehicle, a fan integrally rotatable with a rotor is located on one end in a direction of the axis of the rotor, a bracket for accommodating the fan is joined on one end in the direction of the axis of a stator frame for accommodating a stator, and the bracket is provided with an outside air inlet and a dust emission outlet. The bracket is provided with an expanded section which has an inner peripheral surface bulging on an outer peripheral side in a radial direction beyond a peripheral surface of the stator frame, and at least a part of the dust emission outlet opens to the inner peripheral surface of the expanded section.

6 Claims, 1 Drawing Sheet

(51) Int. Cl.
*H02K 9/26* (2006.01)
*H02K 1/20* (2006.01)
*H02K 5/20* (2006.01)

(58) Field of Classification Search
CPC .......... H02K 9/26; H02K 11/046; H02K 1/20; H02K 1/185; H02K 7/14
USPC ................ 310/62, 63, 88, 89, 50, 52, 55, 58
See application file for complete search history.

(56) References Cited

U.S. PATENT DOCUMENTS

| | | | | |
|---|---|---|---|---|
| 3,610,975 | A * | 10/1971 | Onjanow | H02K 9/18 |
| | | | | 310/57 |
| 3,643,119 | A * | 2/1972 | Lukens | H02K 9/06 |
| | | | | 310/60 R |
| 4,074,156 | A * | 2/1978 | Widstrand | H02K 9/06 |
| | | | | 165/47 |
| 4,142,120 | A * | 2/1979 | Hallerback | H02K 9/28 |
| | | | | 310/227 |
| 6,700,235 | B1 * | 3/2004 | McAfee | H02K 9/06 |
| | | | | 310/52 |
| 6,703,754 | B1 * | 3/2004 | Finkenbinder | F04D 25/06 |
| | | | | 310/227 |
| 6,891,290 | B2 * | 5/2005 | Nagayama | H02K 1/32 |
| | | | | 310/58 |
| 7,166,939 | B2 * | 1/2007 | Voigt | B25F 5/008 |
| | | | | 310/47 |
| 8,269,384 | B2 | 9/2012 | Bradfield | |
| 8,536,743 | B2 * | 9/2013 | Kasuya | B60K 6/48 |
| | | | | 310/52 |
| 8,536,744 | B2 * | 9/2013 | Nagayama | H02K 1/20 |
| | | | | 310/58 |
| 2003/0184172 | A1 * | 10/2003 | Ghiotto | H02K 5/225 |
| | | | | 310/89 |
| 2006/0226717 | A1 * | 10/2006 | Nagayama | H02K 9/14 |
| | | | | 310/58 |
| 2007/0273220 | A1 * | 11/2007 | Koyama | H02K 5/20 |
| | | | | 310/58 |
| 2010/0176670 | A1 | 7/2010 | Gottfried | |
| 2010/0231066 | A1 | 9/2010 | Körner | |
| 2011/0037330 | A1 * | 2/2011 | Dutau | H02K 9/06 |
| | | | | 310/62 |

FOREIGN PATENT DOCUMENTS

| | | |
|---|---|---|
| CN | 201868978 U | 6/2011 |
| JP | 9-46971 A | 2/1997 |
| JP | 2000 324758 A | 11/2000 |
| JP | 2001-95204 A | 4/2001 |
| JP | 2004-194407 | 7/2004 |
| WO | WO-00/52808 A | 9/2000 |

OTHER PUBLICATIONS

Office Action dated Sep. 8, 2015 for the corresponding Japanese Application No. 2013-548167.
Office Action dated Oct. 30, 2015 for the corresponding Chinese Application No. 201280058214.3.

* cited by examiner

FAN COOLED MOTOR WITH DUST CLEANING VENT

CROSS-REFERENCE TO RELATED PATENT APPLICATIONS

This application is a U.S. National Phase Application under 35 U.S.C. § 371 of International Patent Application No. PCT/JP2012/079802, filed Nov. 16, 2012, and claims the benefit of Japanese Patent Application No. 2011-265688, filed on Dec. 5, 2011, all of which are incorporated by reference in their entirety herein. The International Application was published in Japanese on Jun. 13, 2013 as International Publication No. WO/2013/084695 under PCT Article 21(2).

FIELD OF THE INVENTION

The present invention relates to an electric motor for a vehicle with a configuration capable of removing dust contained in the air.

BACKGROUND OF THE INVENTION

An electric motor which cools the inside by using the air taken in as cooling air is known. As this electric motor, an open type electric motor which cools a stator and a rotor by taking the cooling air into the electric motor (for example, refer to JP-A-2001-095204) and a hermetic type electric motor which cools a hermetically-sealed stator and rotor by supplying the cooling air to the outside (for example, refer to JP-A-Hei09-046971) are known.

Technical Problem

It is necessary for the open type electric motor to clean up the inside because the electric motor gets the dust with incoming cooling air by taking the cooling air inside. For this reason, the electric motor is provided with an emission outlet in a bracket on an outer peripheral side of a cooling fan and emits the dust in JP-A-2001-095204. However, in the case that centrifugal force generated by the cooling fan is small when the dust separates from the air, the electric motor could fail to remove the dust enough. Furthermore, the dust has the potential of becoming deposited in a passageway for the cooling air in the hermetic type electric motor.

The present invention aims to provide an electric motor for a vehicle capable of removing enough the dust in the air.

SUMMARY OF THE INVENTION

Solution to Problem

An electric motor for a vehicle according to the present invention solves the above problem by an electric motor for a vehicle, wherein a fan integrally rotatable with a rotor is located on one end in a direction of a axis of the rotor, a fan case for accommodating the fan is joined on one end in the direction of the axis of a stator frame for accommodating a stator, and the fan case is provided with an outside air inlet for introducing air from the outside toward the fan and a dust emission outlet for emitting dust contained in the air which has been led to an outer peripheral side of the fan, wherein the fan case is provided with an expanded section which has an inner peripheral surface bulging on an outer peripheral side in a radial direction beyond a peripheral surface of the stator frame, and at least a part of the dust emission outlet opens to the inner peripheral surface of the expanded section.

According to an electric motor for a vehicle of the present invention, the air entered from the outside air inlet by the rotation of the fan is forced by the centrifugal action and the dust contained in the air is emitted from the dust emission outlet. The air is forced by the centrifugal action at the expanded section formed on the fan case and the air inside the expanded section is forced by the bigger centrifugal action because this inner peripheral surface of the expanded section bulges on the outer peripheral side in the radial direction beyond the inner peripheral surface of the stator frame. For this reason, it is possible to remove the dust in the air with certainly.

As one aspect of the electric motor for the vehicle of the present invention, wherein the fan case is provided with a joint which is joined the stator frame in the direction of the axis, the joint projects on a center side in the radial direction beyond the inner peripheral surface of the expanded section, and the fan case is provided with a reduced diameter section which gradually reduces an inner diameter from the inner peripheral surface of the expanded section toward the joint. According to this, the fan case and the stator frame are connected with the joint and the air flows from the expanded section of the fan case to the inside of the stator frame through the reduced diameter section. The air forced by the centrifugal action is surrounded by the reduced diameter section, the centrifugal force acts enough on the air including the dust and it is possible to emit the dust from the dust emission outlet.

As one aspect of the electric motor for the vehicle of the present invention, wherein the joint projects on the center side in the radial direction beyond the inner peripheral surface of the stator frame. According to this, the projecting portion of the joint prevents the air from entering inside the electric motor. It is possible to avoid the flow of the air in which the dust is not removed enough. The air forced by the centrifugal action by the rotation of the fan is sufficiently surrounded by the projecting portion of the joint and the reduced diameter section and it is possible to emit the dust.

As one aspect of the electric motor for the vehicle of the present invention, wherein a cooling passageway where the air taken by the fan flows is formed on the outer peripheral side of the stator in the stator frame, and the inner peripheral surface of the expanded section bulges on the outer peripheral side in the radial direction beyond the cooling passageway. According to this, the air flows from the fan to the cooling passageway and it is possible to cool the stator and the rotor. It is possible to remove enough the dust contained in the air because the expanded section bulges on the outer peripheral side in the radial direction beyond the cooling passageway.

As the aspect which has the cooling passageway, wherein the stator is provided with an air hole in which the air can flows, and the air hole is provided as at least a part of the cooling passageway. According to this, it is possible to prevent the dust from entering inside the electric motor because the stator is provided with the air hole and it is possible to cool the stator and the rotor.

As the aspect that the stator is provided with the air hole, wherein the stator frame is provided with a ring which reduces a level difference between the inner surface of the stator frame and the inner surface of the air hole. According to this, the reduction in the level difference caused by the ring makes it possible to prevent the air from standing and to allow the air to pass through effectively.

Advantageous Effects of Invention

According to an electric motor for a vehicle of the present invention, as described above, the air entered from the outside air inlet by the rotation of the fan is forced by the centrifugal action and the dust contained in the air is emitted from the dust emission outlet. The air is forced by the centrifugal action at the expanded section formed on the fan case and the air inside the expanded section is forced by the bigger centrifugal action because this inner peripheral surface of the expanded section bulges on the outer peripheral side in the radial direction beyond the inner peripheral surface of the stator frame. For this reason, it is possible to remove the dust in the air with certainly.

BRIEF DESCRIPTION OF DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Description of Embodiments

Figure 1:
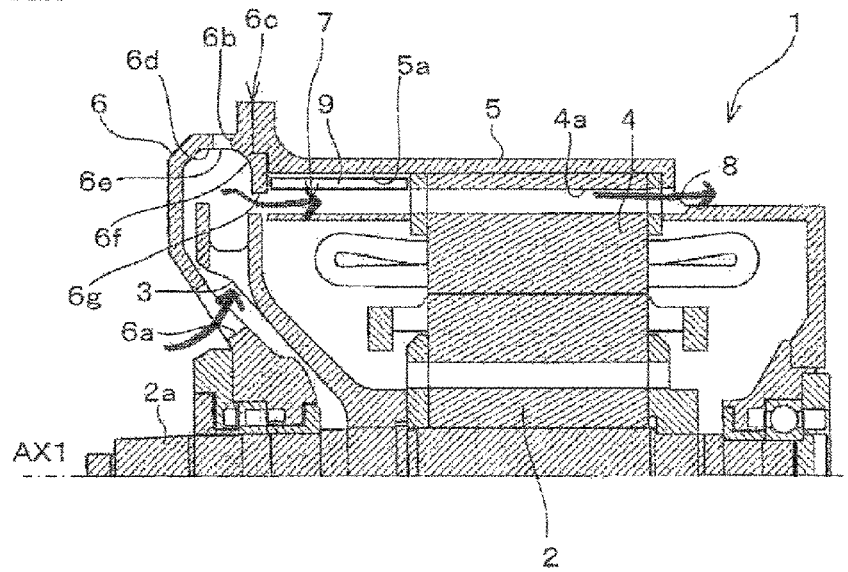
FIG. 1 is a main cross-sectional view of an electric motor for a vehicle according to an embodiment of the present invention.

FIG. 1 shows a main cross-sectional view of an electric motor for a vehicle according to an embodiment of the present invention. In FIG. 1, half of the electric motor 1 which is separated by a direction of an axis AX1 of a rotor axis 2a of a rotor 2 is shown. The electric motor 1 is provided with the rotor 2, a fan 3 which is located on one end in the direction of the axis AX1 and is capable of integrally rotating with the rotor 2, a stator 4 which is located outside the rotor 2, a stator frame 5 which accommodates the stator 4 and a bracket 6 which is joined on one end in the direction of the axis AX1 of the stator frame 5 and accommodates the fan 3 as a fan case. An air hole 4a in which the Air taken by the fan 3 flows is arranged outside the stator 4. The electric motor 1 is a kind of hermetic type electric motor (totally enclosed fan cooled electric motor) which is adapted to make the air taken by the fan 3 flow the air hole 4a and not to flow inside the electric motor having the rotor 2 and the stator 4.

The bracket 6 is provided with an outside air inlet 6a for introducing air from the outside toward the fan 3 and a dust emission outlet 6b for emitting dust contained in the air which has been led to the outer peripheral side of the fan 3. And the bracket 6 is provided with a joint 6c which is joined the stator frame 5 in the direction of the axis AX1 and an expanded section 6e which has an inner peripheral surface 6d bulging on the outer peripheral side in the radial direction beyond the inner peripheral surface 5a of the stator frame 5. The dust emission outlet 6b is located in the inner peripheral surface 6d of the expanded section 6e.

The joint 6c projects on the center side in the radial direction beyond the inner peripheral surface 6d of the expanded section 6e of the bracket 6. For this reason the bracket 6 is provided with a reduced diameter section 6f which gradually reduces the inner diameter from the inner peripheral surface 6d of the expanded section 6e toward the joint 6c. The bracket 6 is provided with a projecting portion 6g which extends the joint surface with the stator frame 5 of the joint 6c to the center side in the radial direction and projects on the center side in the radial direction. A part of the projecting portion 6g may be consisted of the reduced diameter section 6f. The bracket 6 and the stator frame 5 are connected with the joint 6c. A cooling passageway 7, in which the air taken in by the fan 3 flows, is formed on the outer peripheral side of the stator 4 in the stator frame 5. In the present embodiment, the air hole 4a of the stator 4 is provided as a part of the cooling passageway 7. The cooling passageway 7 connects the expanded section 6e with the outlet 8 which emits the air through the air hole 4a. The air entered from the outside air inlet 6a flows through the cooling passageway 7 and is emitted from the outlet 8. The inner peripheral surface 5a of the stator frame 5 is provided with a ring 9 which reduces a level difference from the inner peripheral surface of the air hole 4a. The inner peripheral surface 6d of the expanded section 6e bulges on the outer peripheral side in the radial direction beyond the cooling passageway 7.

The working of the electric motor 1 for a vehicle is explained. When the fan 3 is rotated, the air entered from the outside air inlet 6 flows to the cooling passageway 7. The stator 4 and the rotor 2 are cooled. The dust contained in the air is forced to the outer peripheral side in the radial direction by the centrifugal action by the rotation of the fan 3. The dust is emitted from the dust emission outlet 6b of the inner peripheral surface 5a by the bigger centrifugal force because the inner peripheral surface 6d of the expanded section 6e bulges on the outer peripheral side in the radial direction beyond the inner peripheral surface 5a of the stator frame 5. The bracket 6 is joined the stator frame 5 on the joint 6c and the joint 6c projects on the center side in the radial direction beyond the inner peripheral surface 6d of the expanded section 6e. It is possible to increase the centrifugal force which acts on the dust because the inner peripheral surface 6d bulges on the outer peripheral side in the radial direction by the presence of the joint 6c joined in the radial direction. On the other hand, the air forced by the centrifugal action is surrounded by the reduced diameter section 6f and the projecting portion 6g because the reduced diameter section 6f and the projecting portion 6g is formed in the bracket 6. And the air flows to the cooling passageway 7 after the centrifugal force acts enough on the air including the dust in the expanded section 6e. For this reason, it is possible to remove the dust in the air with certainty and to prevent the dust being included in the air entering the air hole 4a. And it is possible to allow the air to pass through effectively because a level difference between the stator frame 5 forming the cooling passageway 7 and the air hole 4a is eliminated by providing the ring 9 on the cooling passageway 7 and the inner surface of the cooling passageway 7 becomes even.

Figure 2:
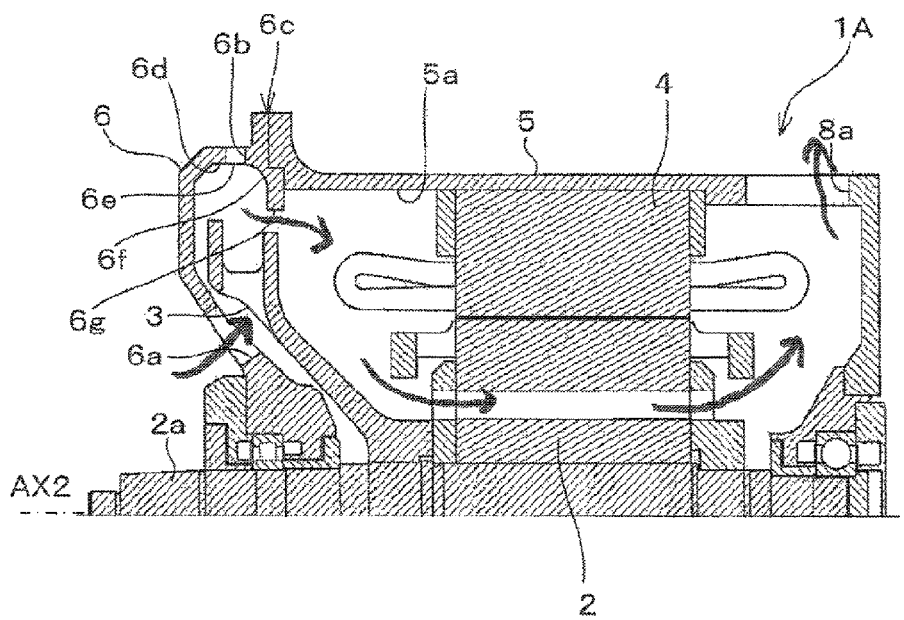
FIG. 2 is a main cross-sectional view of an electric motor for a vehicle according to one of variations of the present invention.

The present invention is not limited to the above-described embodiment, and can be carried out in various kinds of embodiments. In this embodiment, the present invention is explained by the hermetic type electric motor for a vehicle, but the invention is not limited thereto. For example, the present invention is applicable to the open type electric motor. FIG. 2 shows a main cross-sectional view of an electric motor 1A for a vehicle according to one of variations. The electric motor 1A is the open type electric motor which sends the air into the motor including the rotor 2 and the stator 4. Same as FIG. 1, half of the electric motor 1A which is separated by a direction of an axis AX2 is shown. Furthermore, same reference character is marked on a member similar in construction to the member of the electric motor 1 for a vehicle described above and the explanation is omitted. The electric motor 1A is provided with a rotor 2, a fan 3 which is located on one end in the direction of the axis AX1 and is capable of integrally rotating with the rotor 2, a stator 4 which is located outside the rotor 2, a stator frame 5 which accommodates the stator 4 and a bracket 6 which is joined on one end in the direction of the axis AX2 of the stator frame 5 and accommodates the fan 3. The electric motor 1A has the stator 4 without an air hole 4a and a cooling passageway 7 does not exist. The rotating air by the fan passes through the projecting portion 6g, flows into the electric motor and cools the rotor 2 and the stator 4. In this variation, it is possible to emit the dust with certainty by the bigger centrifugal force which acts on the dust contained in the air because the expanded section 6e bulges on the outer peripheral side in the radial direction beyond the inner peripheral surface 5a of the stator frame 5. In this way, the present invention is applicable to various kinds of the hermetic type and the open type electric motor.

In the above described embodiment, it is described that the air hole 4a is provided as a part of the cooling passageway 7, it is not limited to this. For example, all of the cooling passageway 7 may be formed by the air hole 4a. That is, the air hole 4a may be provided as at least a part of the cooling passageway 7. And the air hole 4a of the stator 4 may not be provided as at least a part of the cooling passageway 7. For example, the air hole may be located in the stator frame 5 and form at least a part of the cooling passageway 7, or form the cooling passageway 7 between the stator frame 5 and the outer peripheral surface of the stator 4. And a member forming the cooling passageway 7 may be located between the stator frame 5 and the stator 4. It is possible to appropriately change the configuration of the cooling passageway 7 depending on the shape of the stator 4, the stator frame 5 and the bracket 6.

The invention claimed is:

1. A fan cooled motor, comprising:
    a rotor;
    a fan integrally rotatable with the rotor and located on one end of the motor in a direction of an axis of the rotor;
    a stator with a stator frame for accommodating the stator;
    a fan case for accommodating the fan, which fan case is joined on one end of the motor in the direction of the axis of the stator frame, the fan case is provided with an outside air inlet for introducing air from the outside toward the fan and a dust emission outlet separate from an outlet of the air from the stator frame for emitting dust contained in the air that has been led to an outer peripheral side of the fan with respect to a radial direction, a cooling passageway where the outside air taken in by the fan flows after passing from the fan case, on at least an outer peripheral side of the stator to the outlet from the stator frame; and
    a joint that is joined to the stator frame so as to abut against the stator frame in the direction of the axis on a more radially outer side than the cooling passageway of the stator frame;
    wherein the motor is configured as a hermetic type motor where the stator frame is provided with an inner section that accommodates the rotor and a cooling passageway provided on an outer peripheral side of the stator and, and the cooling passageway is separated from the inner section such that the air taken in by the fan flows into the cooling passage after passing from the fan case and does not flow into the inner section;
    wherein the fan case is provided with an expanded section that is expanded outwardly in the radial direction of the rotation of the fan, the fan case is axially located and extends to cover at least the axial length of the fan, the expanded section has an inner peripheral surface that bulges radially outwardly further than the cooling passageway of the stator frame so as to make the air flow inwardly along with the inner peripheral surface in the radial direction and be introduced into the cooling passageway, and at least a part of the dust emission outlet is provided in the expanded section so as to open to the inner peripheral surface of the expanded section.

2. The fan cooled motor of claim 1, wherein the fan case is joined to the stator frame in the direction of the axis, the joint projects on a center side in the radial direction beyond the inner peripheral surface of the expanded section, and the fan case is provided with a reduced diameter section which gradually reduces an inner diameter from the inner peripheral surface of the expanded section toward the joint.

3. The fan cooled motor of claim 2, wherein the joint projects on the center side in the radial direction beyond the inner peripheral surface of the stator frame.

4. The fan cooled motor of claim 1, wherein the cooling passageway, where the air taken in by the fan flows, is provided on the outer peripheral side of the stator in the stator frame, and also the inner peripheral surface of the stator frame.

5. The fan cooled motor of claim 4, wherein the stator is provided with an air hole in which the air can flow, and the air hole is provided as at least a part of the cooling passageway.

6. The fan cooled motor of claim 5, wherein the stator frame is provided with a ring which reduces a level difference from an inner surface of the air hole.

* * * * *